(12) United States Patent
Abuelsaad et al.

(10) Patent No.: US 10,536,338 B2
(45) Date of Patent: Jan. 14, 2020

(54) NETWORKING CONNECTION RESOLUTION ASSISTANT

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 101 days.

(21) Appl. No.: 15/204,520

(22) Filed: Jul. 7, 2016

(65) Prior Publication Data

US 2018/0013628 A1    Jan. 11, 2018

(51) Int. Cl.
*G06F 15/16* (2006.01)
*H04L 12/24* (2006.01)
*H04L 12/46* (2006.01)

(52) U.S. Cl.
CPC ...... *H04L 41/0886* (2013.01); *H04L 12/4641* (2013.01); *H04L 41/0859* (2013.01)

(58) Field of Classification Search
CPC ............. H04L 41/0886; H04L 41/0859; H04L 12/4633; H04L 12/4041
USPC ....................................................... 709/224
See application file for complete search history.

(56) References Cited

U.S. PATENT DOCUMENTS

| 8,533,780 B2 | 9/2013 | Parla et al. | |
| 2004/0098472 A1* | 5/2004 | Styles | G06F 15/177 709/221 |
| 2004/0133689 A1* | 7/2004 | Vasisht | H04L 29/12216 709/228 |
| 2005/0235352 A1* | 10/2005 | Staats | H04L 41/082 726/14 |
| 2007/0115950 A1* | 5/2007 | Karaoguz | H04L 41/082 370/356 |
| 2007/0300220 A1* | 12/2007 | Seliger | G06F 8/61 718/1 |
| 2008/0043640 A1* | 2/2008 | Smith | H04L 63/0272 370/255 |
| 2008/0052395 A1* | 2/2008 | Wright | H04L 63/20 709/224 |
| 2010/0228837 A1* | 9/2010 | Squire | H04L 41/084 709/220 |
| 2012/0005476 A1* | 1/2012 | Wei | H04L 63/0272 713/153 |
| 2012/0311108 A1* | 12/2012 | Brandwine | H04L 45/586 709/220 |
| 2012/0317260 A1* | 12/2012 | Husain | G06F 3/14 709/223 |
| 2014/0095122 A1* | 4/2014 | Appleman | G06T 19/003 703/1 |

(Continued)

*Primary Examiner* — Karen C Tang
(74) *Attorney, Agent, or Firm* — Griffiths & Seaton PLLC

(57) ABSTRACT

Embodiments for automated accommodation of network configuration settings by a processor. A network connection request is detected. A learned, preexisting network configuration setting corresponding to the network connection request is matched to the network connection request. The network connection is established via the preexisting network configuration setting.

18 Claims, 5 Drawing Sheets

(56) References Cited

U.S. PATENT DOCUMENTS

| | | | |
|---|---|---|---|
| 2014/0172490 A1* | 6/2014 | Snyder | G06Q 10/06313 705/7.23 |
| 2014/0207946 A1 | 7/2014 | Bakthavathsalu et al. | |
| 2014/0293836 A1* | 10/2014 | Iovieno | H04L 63/30 370/259 |
| 2015/0026319 A1* | 1/2015 | Visser | H04L 41/0806 709/221 |
| 2015/0040016 A1* | 2/2015 | Jindal | H04L 51/32 715/735 |
| 2015/0100140 A1* | 4/2015 | Bliss | G06F 8/63 700/86 |
| 2015/0128211 A1* | 5/2015 | Kirner | H04L 63/10 726/1 |
| 2015/0143456 A1* | 5/2015 | Raleigh | H04W 12/08 726/1 |
| 2015/0229510 A1* | 8/2015 | Rao | H04L 47/2475 726/24 |
| 2015/0242237 A1* | 8/2015 | Spivak | G06F 9/5055 718/1 |
| 2015/0244767 A1* | 8/2015 | Jackowski | H04L 47/2475 709/203 |
| 2016/0036780 A1 | 2/2016 | Xie et al. | |
| 2016/0112545 A1* | 4/2016 | He | H04L 29/06 370/235 |
| 2016/0212012 A1* | 7/2016 | Young | H04L 41/14 |
| 2016/0241893 A1* | 8/2016 | Allhands | H04N 21/241 |
| 2016/0294646 A1* | 10/2016 | Kirner | H04L 41/5054 |
| 2016/0337185 A1* | 11/2016 | Hardison | H04W 4/80 |
| 2017/0099260 A1* | 4/2017 | Cohn | G06F 9/30098 |
| 2017/0201990 A1* | 7/2017 | Wang | H04W 72/04 |
| 2017/0237619 A1* | 8/2017 | Flynn | H04L 41/0886 709/221 |
| 2017/0242888 A1* | 8/2017 | Bommireddipalli | G06F 17/30306 |
| 2017/0249035 A1* | 8/2017 | Pohja | H04W 76/10 |
| 2017/0256157 A1* | 9/2017 | Johan | H04L 12/2858 |
| 2017/0295265 A1* | 10/2017 | Hala | H04L 67/34 |
| 2017/0366395 A1* | 12/2017 | Goldfarb | H04L 12/4633 |
| 2017/0366471 A1* | 12/2017 | Baker | H04L 41/0809 |
| 2018/0020498 A1* | 1/2018 | Park | H04W 76/043 |

* cited by examiner

NETWORKING CONNECTION RESOLUTION ASSISTANT

BACKGROUND OF THE INVENTION

Field of the Invention

The present invention relates in general to computing systems, and more particularly to, various embodiments for facilitating connection to a network using a computing processor.

Description of the Related Art

In today's society, consumers, users, and other individuals find themselves in interconnected computing environments (e.g., computing environments where the user is connected to another computing environment via one or more networks). Networked computing devices are increasingly found in places throughout homes, businesses, churches, and other locations. Additionally, the user may use a single device in a number of settings, with each setting having different networking criteria. For example, the user may use one network to connect his smartphone at home, and use a different network to connect his smartphone at work.

SUMMARY OF THE INVENTION

Various embodiments for automated accommodation of network configuration settings by a processor are provided. In one embodiment, by way of example only, a method for automated accommodation of network configuration settings is provided. A network connection request is detected. A learned, preexisting network configuration setting corresponding to the network connection request is matched to the network connection request. The network connection is established via the preexisting network configuration setting.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
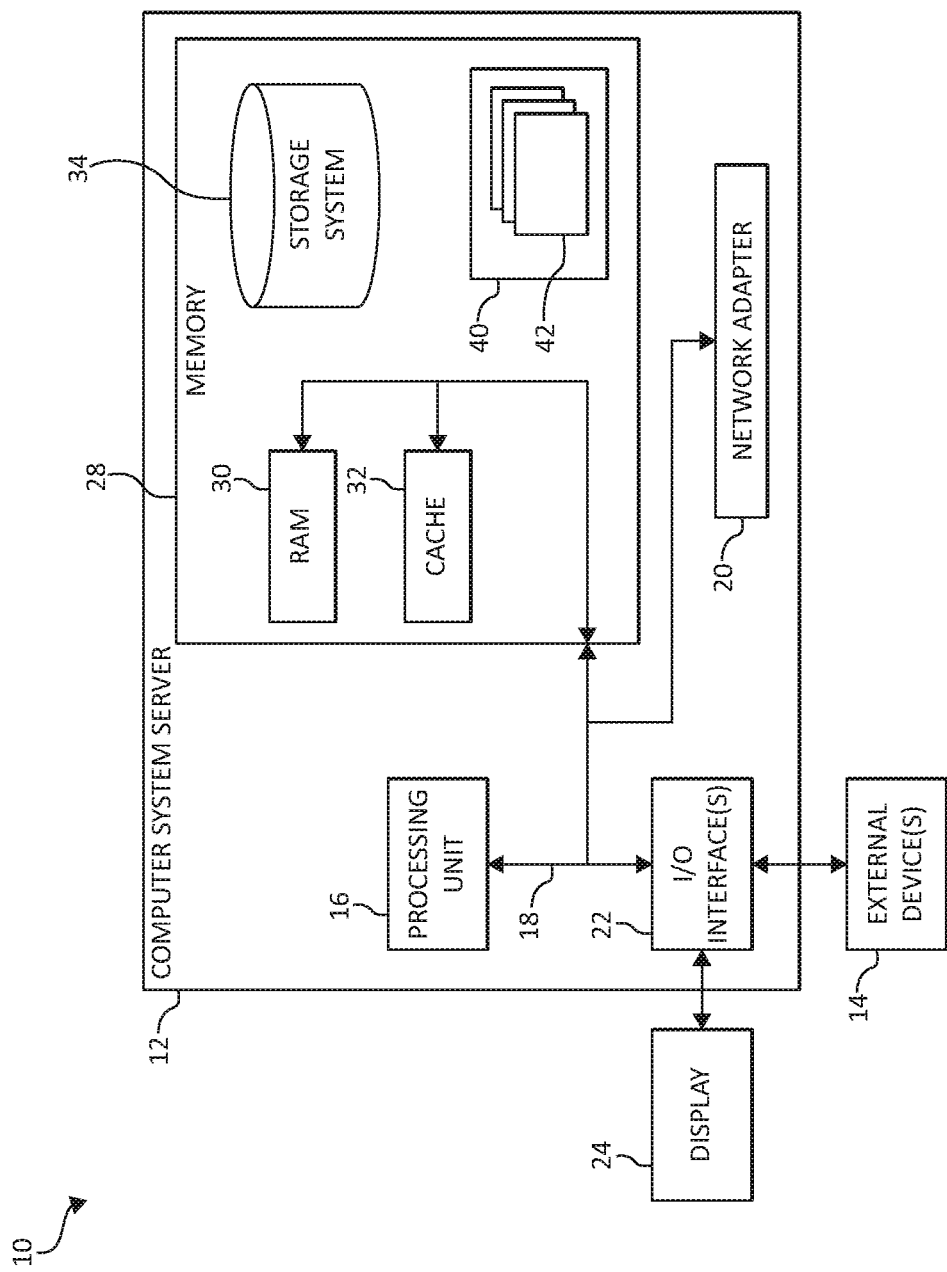
FIG. 1 is a block diagram depicting an exemplary cloud computing node according to an embodiment of the present invention.

As previously indicated, the use of devices connected through various networks has proliferated in recent years. Moreover, the use of the same device in a number of locations to access various networks has also proliferated. Attendant with each network connection (e.g., Local Area Networks (LANs), Wide Area Networks (WANs), Virtual Private Networks (VPNs), File Transfer Protocol (FTP) networks, and the like) are particular network configuration settings that enable the device to reach the particular network destination.

If, for example, a user works for some sort of business, more likely than not that business requires modification to the networking flow in order to connect to the business' internal business network. An example of such modification is use of the aforementioned VPN. A user would normally launch a VPN client (e.g., VPN application), click "connect," wait for that connection to take place, and finally visit the private network they wish to access.

However, a user often forgets the VPN launch step (or other required network security measure(s), and simply, for example, opens a browser and expects to have access to a particular website. Only after the web browser or other application fails to connect to the remote Uniform Resource Locator (URL) address (e.g., "times out") does it then dawn on the user that they have forgotten a necessary network configuration step in the connection process, such as forgetting to launch the VPN. In some situations, the issue may give rise to a service or help desk call, or at a minimum cause the expenditure of time and resources on the part of the user and/or IT support personnel, not to mention the lost productivity of the user until the situation is resolved.

In view of the foregoing, a need exists for mechanisms that identify, learn, categorize, and implement in real time, network configuration settings adjustments for devices to help alleviate the challenges described previously. To address these challenges, the mechanisms of the present invention present various solutions for automated network configuration settings management in, for example, a centralized setting and featuring control within and between distributed computing components. For example, IT administrators may assign automated networking configuration tasks per specific devices, such that if a recognized device attempts to make a connection, the appropriate networking configuration tasks are implemented as a background process (e.g., the user simply opens the web browser and the browser navigates to the internal private network address without delay). Additional related aspects and features of the mechanisms of the illustrated embodiments will be further described, following.

It will be noted that the terminology used herein referring to "network configuration settings" may refer to a wide variety of configuration settings relating in any way to any network. For example, the network configuration settings may specifically refer to VPN settings (including mechanisms for launching VPN applications, configuring VPN settings, and managing a VPN network). The network configuration settings may refer to local network management settings, remote network management settings, wireless and similar communication protocols settings, and still other settings. Thus, use of the terminology "network configuration settings" herein is intended to broadly refer to settings for facilitating the opening/establishment/closing of network connections, among other settings, and not simply the management of network settings themselves.

As a preliminary matter, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. In addition, and as is contemplated, the computer system/server 12 may communicate to computing devices 14 attempting to perform network configuration operations, such as computers, smartphones, tables, and other devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
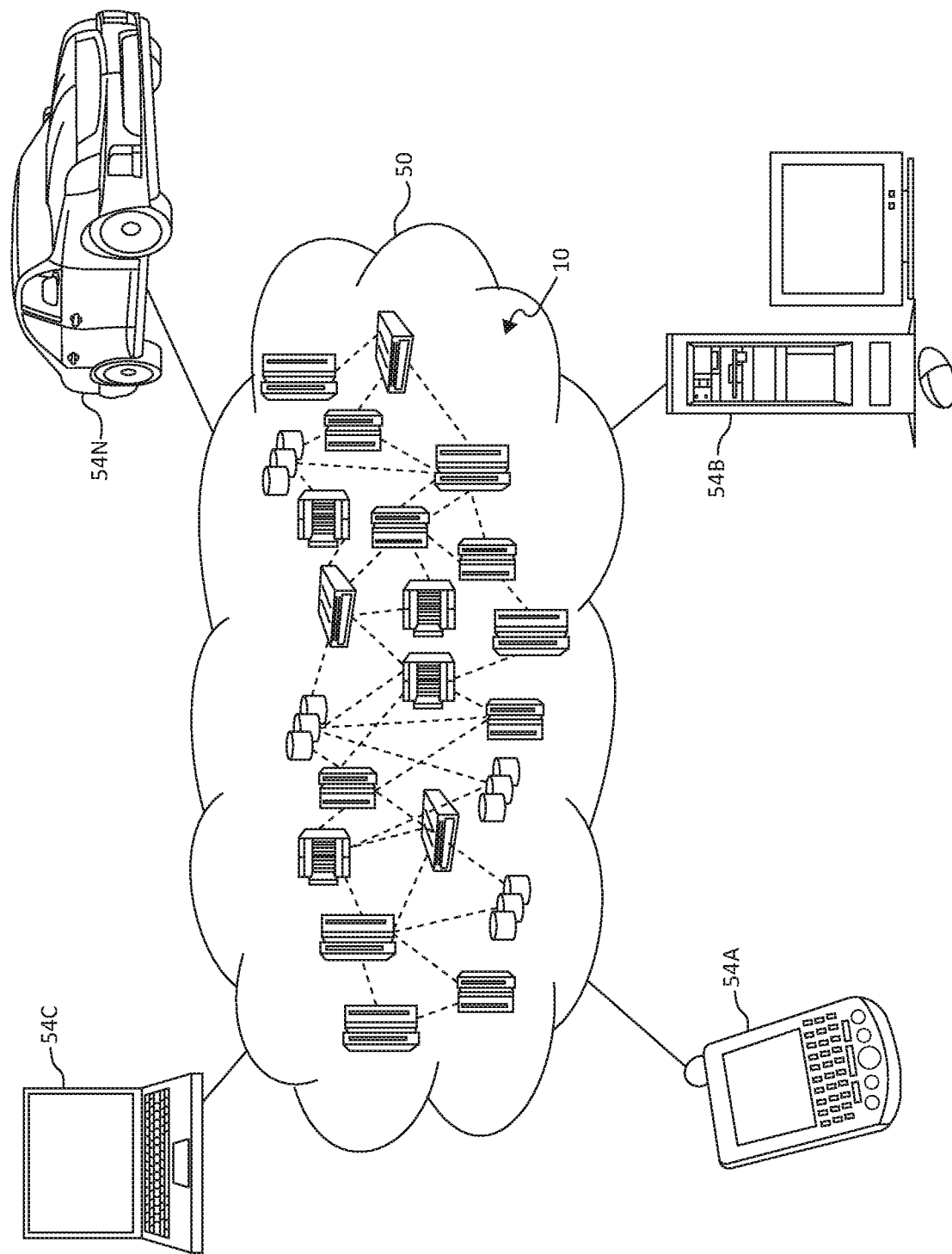
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, smartphone or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
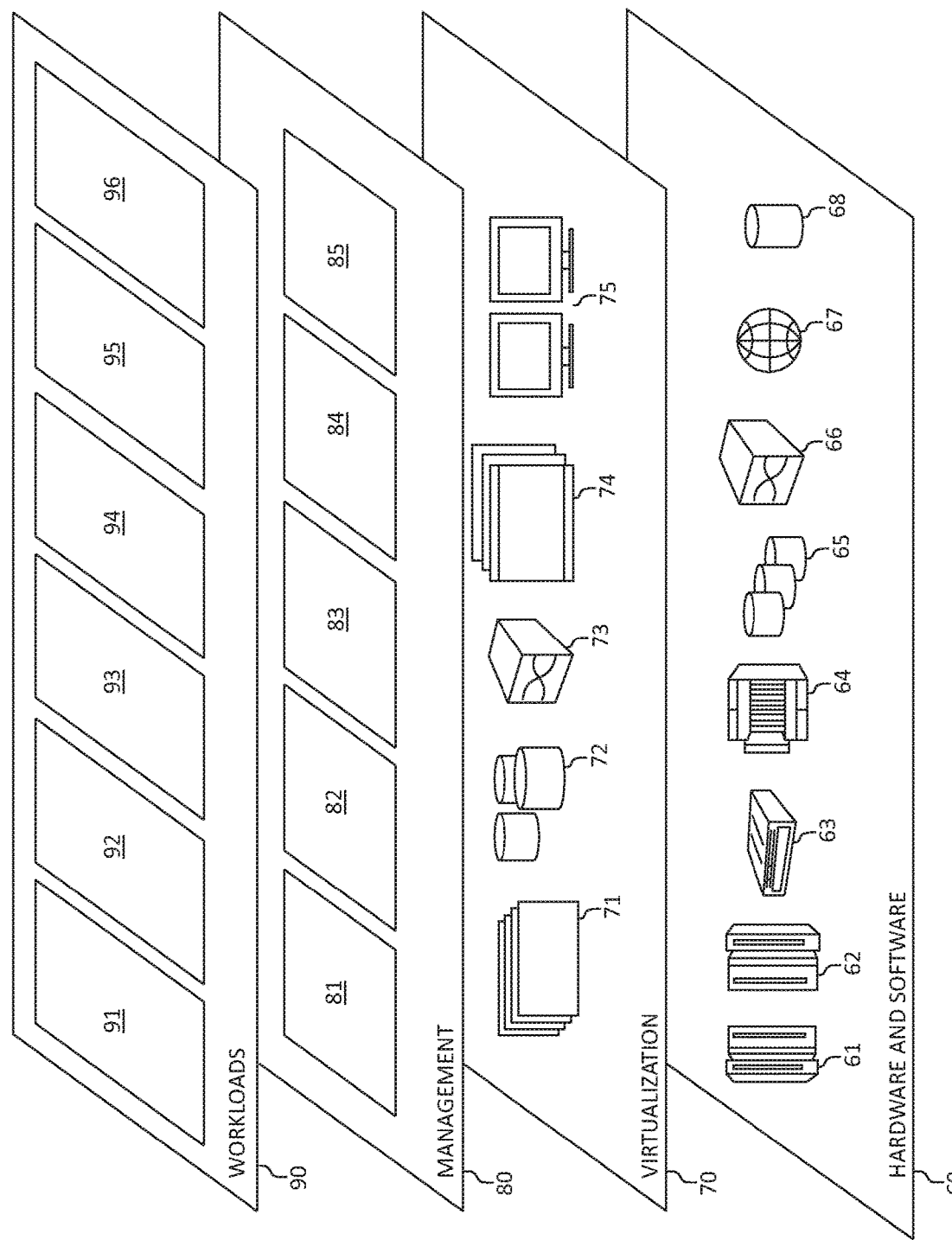
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various network configuration workloads and functions 96. In addition, network configuration workloads and functions 96 may include such operations as network analytics, historical analysis, and as will be further described, network configuration control functions.

As will be described, various functional components referred to herein that perform various aspects of the present invention may be, in one embodiment, thought to be encompassed by the functionality depicted in network configuration workloads and functions 96. These may include centralized repositories of network configuration information, for example. A centralized version of reference structures such as IP mappings, VPN databases, routing tables, and other information may be initiated, organized, searched, shared, and the like, for example.

One of ordinary skill in the art will appreciate that the network configuration workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, users may have challenges when connecting to a particular network, such as a VPN in a business setting. Businesses and IT administrators would prefer, however, that the user's connection process be seamless. If a user directs, for example, their web browser to a URL or an application, which makes a call to a specific hostname/IP address (e.g., w3.tools.XYZ.com or 9.112.123.10), and every time the user makes the connection the associated traffic proceeds through a VPN tunnel, then it may be assumed that the instant VPN connection is needed for that particular connection. In addition, if every time a user connects to any URL that resolves to 9.* IP addresses, it may be assumed that the particular VPN tunnel is needed. These assumptions may be learned generalizations by the mechanisms of the present invention as will be further described.

The mechanisms of the illustrated embodiments seek to allow such generalizations to be memorialized as what will be termed "rules" herein. These rules may be configured (e.g., by an IT administrator), and/or the rules may be learned by the system. Since most users of such technology may belong to a particular business organization, most of the users will have the majority of the same rules. Accordingly, sets of rules may be distributed in the computing devices of various groups of employees, for example, and/or synchronized between various employee computing devices.

In one embodiment, the mechanisms of the illustrated embodiments may implement a variety of stored configuration settings and network alterations to facilitate a particular connection, as described, yet also, in case of a particular error (e.g., HTTP 404 or the like for other protocols), check the maintained stored configuration settings to find a matching setting, and in real time, recover, so the user continues to their intended destination.

In one embodiment, the present invention may implement two aspects to further the purposes of the present invention. A first aspect is a reference structure associating such network information as URLs and IP address. The reference structure may exist in the form of a cache on the client device, for example (e.g., external device 14, FIG. 1). The reference structure may contain learned network configuration information, such as a last known IP address, to which a given URL resolved to. In an alternative embodiment, the learned network configuration information may include a specific IP address that the given URL resolves to most often. In the case of network configuration embodiments making use of VPN configuration information to automate connectivity, the reference structure may be referred to as a "VPNDNS" structure.

A second aspect of the present invention concerns what is referred to herein as a "rules engine." In one embodiment, the rules engine is an IP rules engine, inclusive of a mapping between various IP addresses or a segment of an IP address (e.g., such as a "9.*"), and one or more actions to take if the client device attempts to access a specified IP (or, for example, an IP address in a given range) and fails/times out. The rules engine also may reside on the client device. The rules engine may be manually configured to associate various actions, such as associating a necessary VPN, for example, to protected network resources. In addition to the foregoing, in various embodiments, the rules engine may also engage in learning activities to glean historical behavior information from a user's network connection activity accessing protected network resources. For example, if a client device is determined to launch "XYZ VPN" whenever the client device accesses "9.*", the rules engine may store this observation as a new rule.

In alternative embodiments, the rules engine and/or reference structure/VPNDNS may be synced to a new user device, and the information from the reference structure and rules engine may then be transferred to the new user device. In addition, the information in the reference structure and rules engine may be "shared" in various scenarios between existing devices and the new user device (or, for example, between an IT administrator device and the new device). To accomplish the various syncing functionality, centralized repositories of the information contained in the reference structure/VPNDNS and/or IP rules may reside (e.g., on computer system/server 12, or elsewhere) as one of ordinary skill in the art will appreciate.

Figure 4:
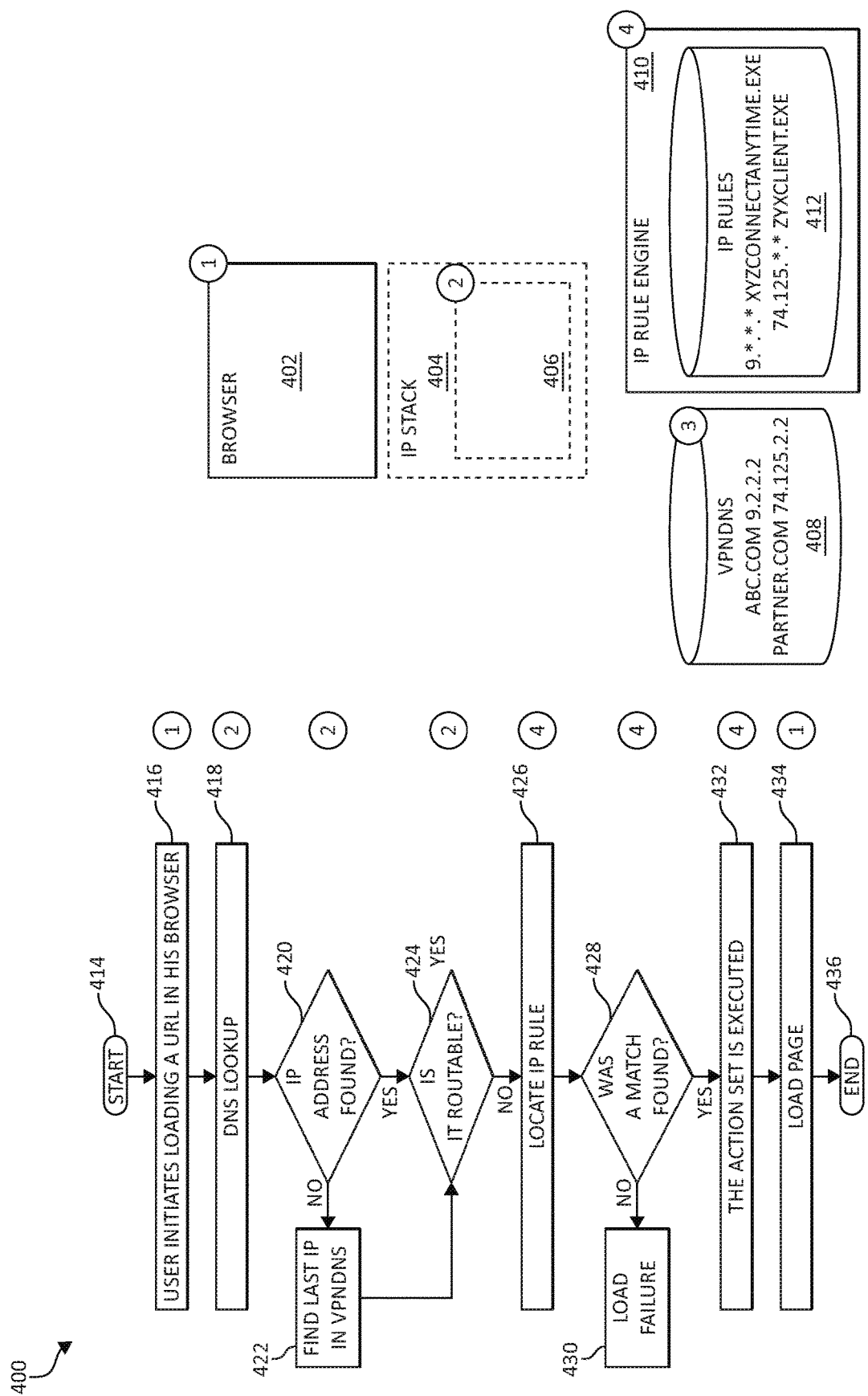
FIG. 4 is a flow chart diagram depicting an exemplary method for automated accommodation of network configuration settings by a processor, and a block diagram of various computing components utilized in the depicted method, in accordance with one embodiment of the present invention.

Turning now to FIG. 4, a block diagram of various structures (hardware and/or software) that may be implemented in effecting various mechanisms of the present invention. In addition, a flow chart diagram of an exemplary method 400 for automated accommodation of network configuration settings is depicted, in which various aspects of the present invention may be implemented.

The exemplary method 400 depicts exemplary various structures that are engaged to effect various steps of the method 400, although one of ordinary skill in the art will appreciate that additional hardware, software and/or firmware components may be leveraged to effect various aspects of the present invention.

A common browser application 402 is represented (denoted for the application's use in the method 400 as "1"). Associated with the browser 402 is the IP stack 404, inclusive of a plug-in networking watcher module 406 as shown. In one embodiment, the networking watcher module 406 executes on, or is otherwise associated with, the IP stack 404. The IP stack 404 and networking watcher module 406's contribution to method 400 is denoted in FIG. 4 as "2" as shown.

The reference structure/VPNDNS 408 as shown includes various mapping information for network configuration settings, such as the URL "ABC.com" mapped to IP address 9.2.2.2 as shown, along with the URL "Partner.com" shown mapped to IP address 74.125.2.2. The VPNDNS structure 408 is denoted with "3" to show the VPNDNS 408's contribution to the various steps in the exemplary method 400.

Similarly, the IP rules engine 410 (denoted with "4" to show the rules engine's contribution to the method 400), includes the various learned (or configured) IP configuration settings shown, such as any IP address with 9.*.*.* mapped to XYZConnectAnytime.exe, and the segment of IP addresses corresponding to 74.125.*.* mapping to ZYXClient.exe as shown.

In view of the foregoing, consider the following exemplary usage embodiment of various aspects of the present invention. A user may first attempt to access a website, such as "acme.com," from a browser. The user's computing device then performs a DNS lookup, and determines the corresponding IP address (e.g., 9.x.x.x). The TCP/IP stack on the user's computing device, based on the DNS lookup and from historical data, may then determine whether the device has a valid or invalid route to this resource, and also make a determination whether a VPN is needed to access the destination.

The networking watcher then examines the IP rules engine for the found IP address, or at least part of the subject IP address starting from the left of the IP address. For example, a rule for "9.*" will match a given IP address of 9.5.11.111. At this stage, the networking watcher knows if the watcher has a corresponding rule for the given IP address.

If the destination IP address is one that does not require any network alterations, such as implementation of a VPN, the TCP/IP stack then sends the request to the proper destination. If the destination IP address is one that is determined to need networking alterations, such as launching a VPN, the networking watcher then determines the appropriate actions and executes them. Any actions found in the IP Rules Engine are executed by the Networking Watcher (for example, Launch XYZ VPN.exe). If a particular VPN has a dependency on another VPN, for example, the system will launch the VPNs in order of dependency.

Consider now method 400, which illustrates exemplary steps in which various aspects of the present invention may be implemented. Method 400 begins (step 414) with a user initiating loading a URL in his browser in step 416) as performed by the browser. The client device's IP stack then performs a DNS lookup and attempts to determine the corresponding IP address (e.g., 9.x.x.x) (step 418).

If an IP address is found, decision step 420 moves to step 424, which queries whether the browser is routable to the intended destination. If an IP address is not found, the method 400 moves to step 422, which again involves the client device's IP stack finding the last valid IP address in the VPNDNS structure matching the respective IP address, and then moves to step 424.

Again, in step 424, the method 400 queries whether the destination sought is routable from the browser. If yes, the method 400 then moves to step 434 below, where the destination page is loaded. The method 400 then ends (step 436).

Returning to step 424, if the given IP address is determined not to be routable, then a corresponding IP rule is attempted to be located in the IP rules engine (step 426). If a match is not found (decision step 428), a load failure occurs (step 430). If a match is found, the corresponding action set is executed (step 432) to allow the user device access, and the respective page is loaded (step 434). The method 400 then ends (again, step 436).

Figure 5:
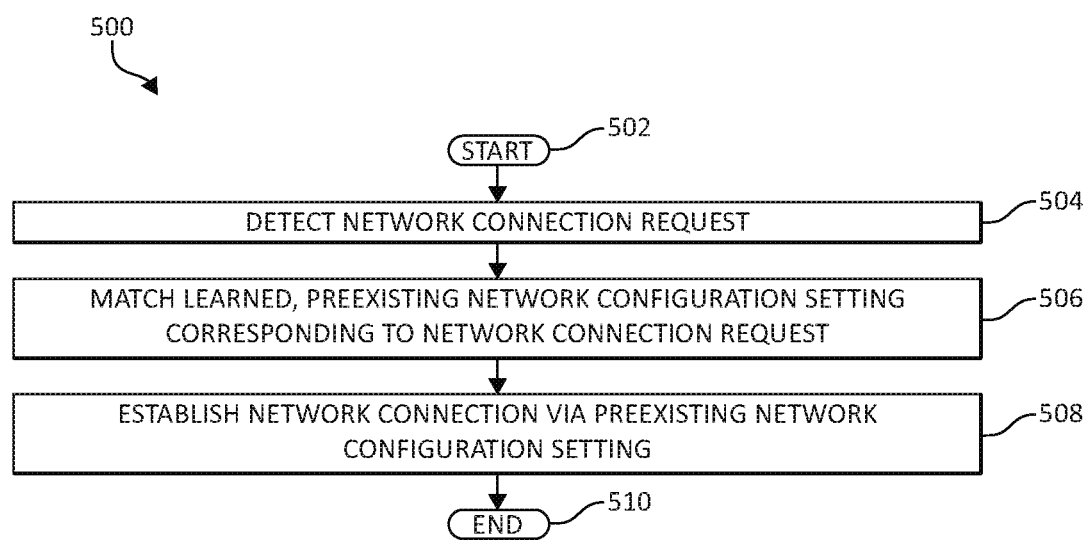
FIG. 5 is a flow chart diagram of an exemplary method for automated accommodation of network configuration settings by a processor, in which various aspects of the present invention may be implemented.

Turning now to FIG. 5, an additional flow chart of an exemplary method for automated accommodation of network configuration settings is depicted in method 500, here again in which aspects of the present invention may be implemented. Method 500 begins (step 502) with the detection of a network connection request. One or more learned and/or preexisting network configuration settings are matched to the corresponding network connection request (step 506). The network connection is then established via preexisting network configuration setting(s) (step 508). The method 500 then ends (step 510).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automated accommodation of network configuration settings by a processor, comprising:
   detecting a network connection request;
   matching a learned, preexisting network configuration setting corresponding to the network connection request; wherein matching the learned, preexisting network configuration setting further includes automatically launching a Virtual Private Network (VPN) connection through a VPN application as a background process, and configuring the VPN application using the preexisting network configuration found to correspond to the network connection request such that the VPN application is initiated and the VPN connection is automatically established in response to a user directing a web browser to a particular Uniform Resource Locator (URL) known to necessitate the VPN connection; and wherein the particular URL known to necessitate the VPN connection is identified as any URL resolving to a particular range of Internet Protocol (IP) addresses learned over observations of historical access patterns of the user as previously having necessitated the VPN connection; and
   establishing the network connection via the preexisting network configuration setting.

2. The method of claim 1, wherein detecting the network connection request further includes determining if the detected network connection request requires a reconfiguration operation using the preexisting network configuration setting.

3. The method of claim 2, further including, if the detected network connection is determined not to require a reconfiguration operation, allowing the network connection to route per a default network configuration.

4. The method of claim 1, further including gathering the learned, preexisting configuration setting from a shared location.

5. The method of claim 1, wherein matching a learned, preexisting network configuration setting further includes:
   consulting a cache directory linking the particular URL with an IP address, or
   consulting a rules engine linking at least a portion of the IP address with a corresponding action.

6. The method of claim 5, further including executing the corresponding action via a network watcher tool.

7. A system for automated accommodation of network configuration settings, comprising:
   a processor, that:
      detects a network connection request,
      matches a learned, preexisting network configuration setting corresponding to the network connection request; wherein matching the learned, preexisting network configuration setting further includes automatically launching a Virtual Private Network (VPN) connection through a VPN application as a background process, and configuring the VPN application using the preexisting network configuration found to correspond to the network connection request such that the VPN application is initiated and the VPN connection is automatically established in response to a user directing a web browser to a particular Uniform Resource Locator (URL) known to necessitate the VPN connection; and wherein the particular URL known to necessitate the VPN connection is identified as any URL resolving to a particular range of Internet Protocol (IP) addresses learned over observations of historical access patterns of the user as previously having necessitated the VPN connection, and establishes the network connection via the preexisting network configuration setting.

8. The system of claim 7, wherein the processor, pursuant to detecting the network connection request, determines if the detected network connection request requires a reconfiguration operation using the preexisting network configuration setting.

9. The system of claim 7, wherein the processor, if the detected network connection is determined not to require a reconfiguration operation, allows the network connection to route per a default network configuration.

10. The system of claim 7, wherein the processor gathers the learned, preexisting configuration setting from a shared location.

11. The system of claim 7, wherein the processor, pursuant to matching a learned, preexisting network configuration setting:

consults a cache directory linking the particular URL with an IP address, or consults a rules engine linking at least a portion of the IP address with a corresponding action.

12. The system of claim 11, wherein the processor executes the corresponding action via a network watcher tool.

13. A computer program product for automated accommodation of network configuration settings by a processor, the computer program product comprising a non-transitory computer-readable storage medium having computer-readable program code portions stored therein, the computer-readable program code portions comprising:

an executable portion that detects a network connection request;

an executable portion that matches a learned, preexisting network configuration setting corresponding to the network connection request; wherein matching the learned, preexisting network configuration setting further includes automatically launching a Virtual Private Network (VPN) connection through a VPN application as a background process, and configuring the VPN application using the preexisting network configuration found to correspond to the network connection request such that the VPN application is initiated and the VPN connection is automatically established in response to a user directing a web browser to a particular Uniform Resource Locator (URL) known to necessitate the VPN connection; and wherein the particular URL known to necessitate the VPN connection is identified as any URL resolving to a particular range of Internet Protocol (IP) addresses learned over observations of historical access patterns of the user as previously having necessitated the VPN connection; and an executable portion that establishes the network connection via the preexisting network configuration setting.

14. The computer program product of claim 13, further including an executable portion that, pursuant to detecting the network connection request, determines if the detected network connection request requires a reconfiguration operation using the preexisting network configuration setting.

15. The computer program product of claim 13, further including an executable portion that, if the detected network connection is determined not to require a reconfiguration operation, allows the network connection to route per a default network configuration.

16. The computer program product of claim 13, further including an executable portion that gathers the learned, preexisting configuration setting from a shared location.

17. The computer program product of claim 13, further including an executable portion that, pursuant to matching a learned, preexisting network configuration setting:

consults a cache directory linking the particular URL with an IP address, or consults a rules engine linking at least a portion of the IP address with a corresponding action.

18. The computer program product of claim 17, further including an executable portion that executes the corresponding action via a network watcher tool.

* * * * *